Feb. 5, 1952     O. G. NELSON     2,584,282
HOLDING APPARATUS FOR TESTING CABLES

Filed April 4, 1944     3 Sheets-Sheet 1

INVENTOR
O. G. NELSON
BY
ATTORNEY

Feb. 5, 1952 O. G. NELSON 2,584,282
HOLDING APPARATUS FOR TESTING CABLES
Filed April 4, 1944 3 Sheets-Sheet 2
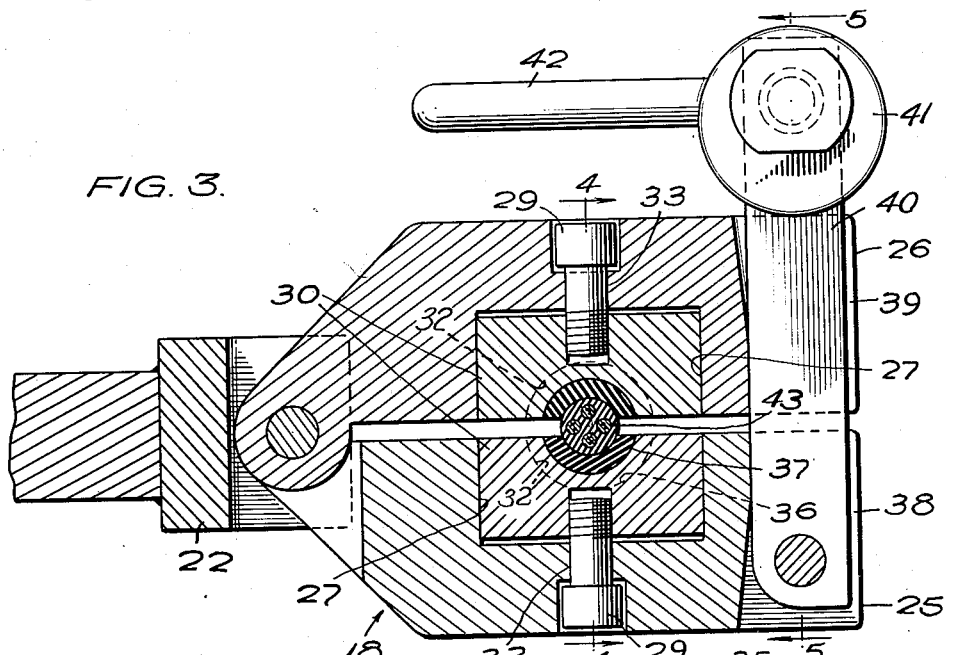
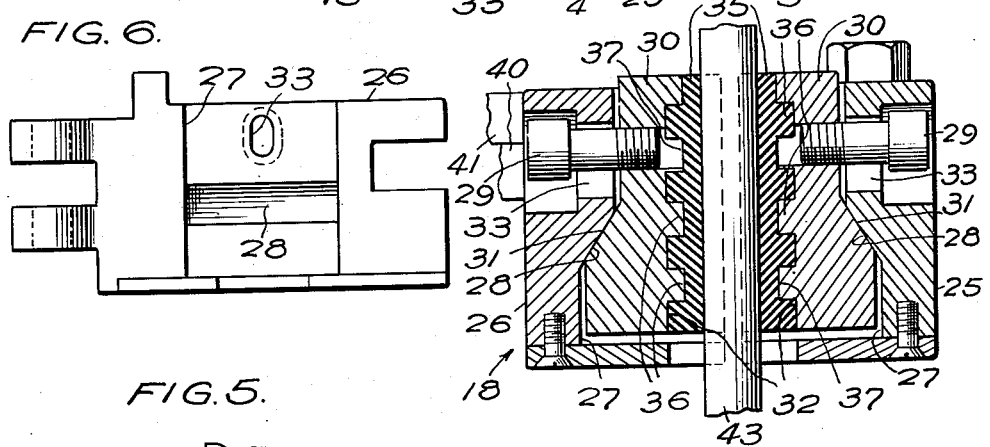
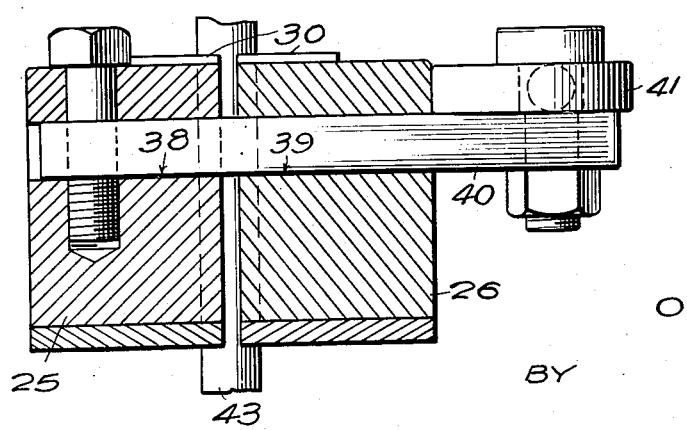
INVENTOR
O. G. NELSON
BY
ATTORNEY Feb. 5, 1952     O. G. NELSON     2,584,282
HOLDING APPARATUS FOR TESTING CABLES
Filed April 4, 1944     3 Sheets-Sheet 3
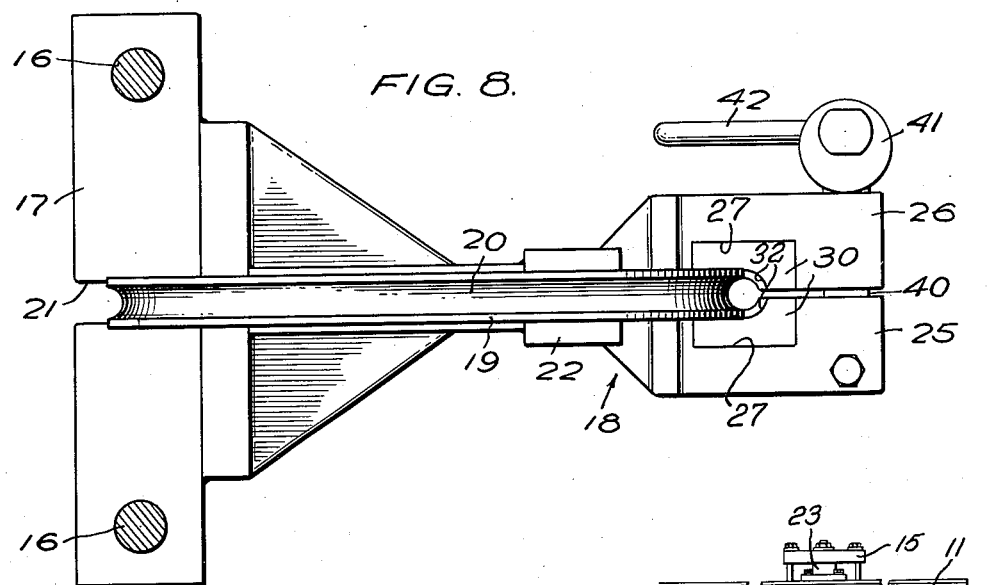
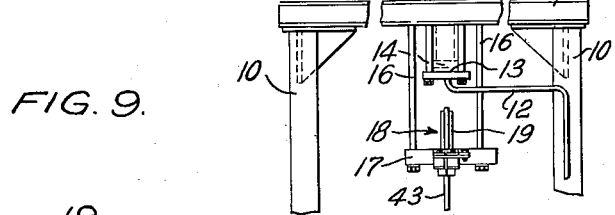
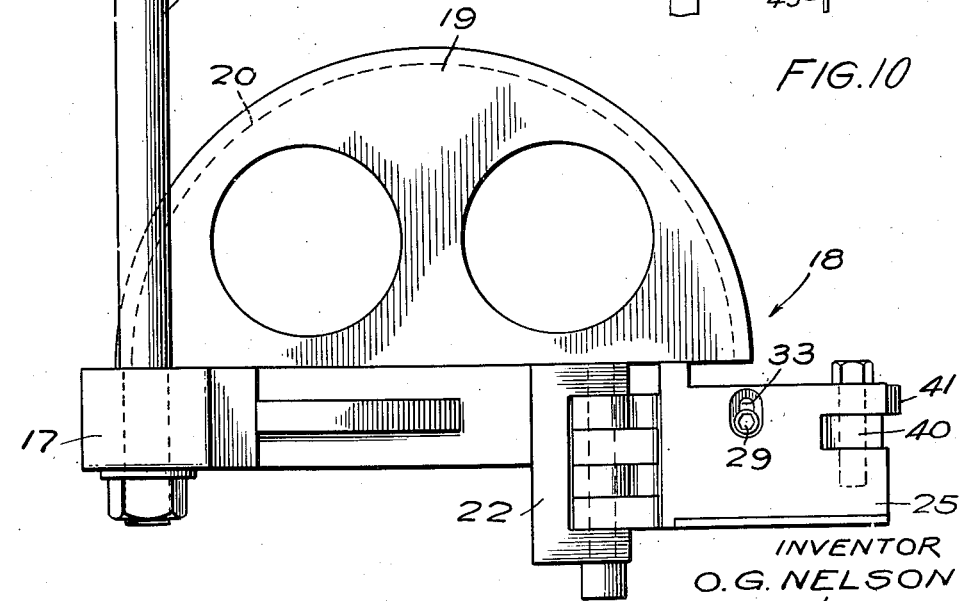
INVENTOR
O. G. NELSON
BY
ATTORNEY Patented Feb. 5, 1952

2,584,282

UNITED STATES PATENT OFFICE 2,584,282

HOLDING APPARATUS FOR TESTING CABLE

Oscar G. Nelson, Baltimore, Md., assignor to Western Electric Company, Incorporated, New York, N. Y., a corporation of New York Application April 4, 1944, Serial No. 529,518

1 Claim. (Cl. 24—115)

This invention relates to apparatus for holding articles and more particularly to apparatus for clamping and supporting cables.

In certain tests of cables, the cables being tested must be placed under considerable tension. Means must be provided in apparatus for applying such tests for supporting the cables in a manner in which the cables will not be damaged by the supporting means.

An object of the invention is to provide new and improved apparatus for holding articles.

One type of apparatus embodying the invention comprises a snubber having a non-angular surface thereon and a clamp adjacent to one end of the snubber for holding a cable placed on the non-angular surface.

A complete understanding of the invention may be obtained from the following detailed description of a specified embodiment thereof when read in conjunction with the appended drawings, in which Fig. 1 is a side elevation of an apparatus embodying the invention;

Fig. 3 is an enlarged horizontal section taken along line 3—3 of Fig. 1;

Fig. 4 is an enlarged, vertical section taken along line 4—4 of Fig. 3;

Fig. 5 is an enlarged vertical section taken along line 5—5 of Fig. 3;

Fig. 6 is an enlarged elevation of a portion of the apparatus;

Fig. 8 is an enlarged fragmentary plan view of a portion of the apparatus;

Fig. 9 is an enlarged side elevation of a portion of the apparatus, and

Fig. 10 is a reduced, fragmentary rear elevation of a portion of the apparatus.

Figure 2:
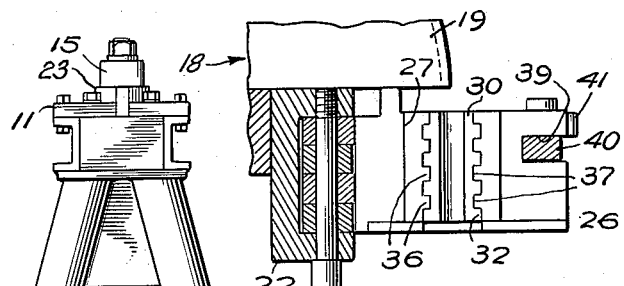
Fig. 2 is an enlarged fragmentary, vertical view in partial section of the apparatus.

Referring more specifically to the drawings, two inverted V frames 10—10 (Fig. 10) support a cross bar 11 which supports a conventional fluid actuated lifting device. The lifting device is provided with a cylinder 13 in which is mounted a piston 14. The cylinder may be supplied with a suitable actuating fluid, such as air, by conventional means including a pipe 12 to move the piston up or down at the will of an operator.

A rod 23 is secured to the piston 14 and extends upwardly from the cylinder. A crosshead 15 is secured to the upper end of the rod 23 and may be moved upwardly with the piston when the actuating fluid is supplied to the lower portion of the cylinder 13 or downwardly when the lower portion of the cylinder is exhausted. Two rods 16—16 (Fig. 10) are fastened to the crosshead 15 and a yoke 17 is secured to the lower ends of the rods. A similar fluid actuated lifting device is disclosed in Patent No. 2,446,820 issued August 10, 1948.

A clamping unit 18 (Figs. 8 and 9) is secured to the yoke 17 and includes a semicircular snubber 19 having an arcuate groove 20 formed in the periphery thereof. One end of the groove 20 is aligned with a notch 21 formed in the yoke 17, as viewed in Fig. 8. A bracket 22, fastened to the snubber 19 and the yoke 17, serves to hingedly support a pair of jaws 25 and 26. The jaws 25 and 26 have passages 27—27 formed therein in which a pair of inserts 30—30, having wedged-shaped surfaces 31—31 (Fig. 4) formed thereon, are secured by bolts 29—29. The passages 27—27 have wedge-shaped surfaces 28—28 formed therein. The bolts 29—29 project through slots 33—33 formed in the jaws 25 and 26, thereby permitting the inserts 30—30 to be slid upwardly or downwardly in the passages 27—27. As the inserts are slid upwardly, as viewed in Fig. 4, the wedge-shaped surfaces 31—31 are engaged by the wedge-shaped surfaces 28—28, whereby each insert is thrust toward the other insert.

The inserts 30—30 (Figs. 3 and 4), which form a part of the clamping unit 18, have complementary semicircular grooves 32—32 formed therein in which elongated, semicylindrical grippers 35—35, composed of a rubber or some other resilient composition, are molded. Ribs 36—36 formed on the jaws 25 and 26 project into the grooves 32—32 and fit into slots 37—37 formed in the grippers 35—35 to hold the grippers 35—35 against longitudinal movement with respect to the inserts 30—30.

The jaws 25 and 26 (Fig. 5) have slots 38 and 39, respectively, formed therein. One end of a latch 40 is pivotally mounted in the slot 38 and the free end thereof has an eccentric cam 41 rotatably secured thereon. A handle 42 (Fig. 3) secured to the cam 41 serves to rotate the cam with respect to the latch 40. Thus, when the jaws 25 and 26 are swung together, as shown in Fig. 3, the latch 40 is swung into the slot 39 and the cam 41 turned to lock the jaws 25 and 26 in an abutting cooperative relationship, whereby the grippers 35—35 serve to frictionally grip a cable 43 positioned in the groove 20.

Figure 7:
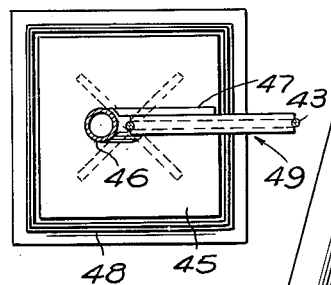
Fig. 7 is a plan view of a portion of the apparatus.

A weight 45 (Figs. 1 and 7) has a post 46 projecting therefrom to which post a plate 47 is welded. The weight 45 is slidably mounted in a guard 48. A clamping unit 49, which is identical with the clamping unit 18, is secured to the plate 47 in inverted relationship with respect to the clamping unit 18. The clamping unit 49 is designed to frictionally grip an end of the cable 43 in a manner similar to that in which the clamping unit 18 grips the cable.

Figure 1:
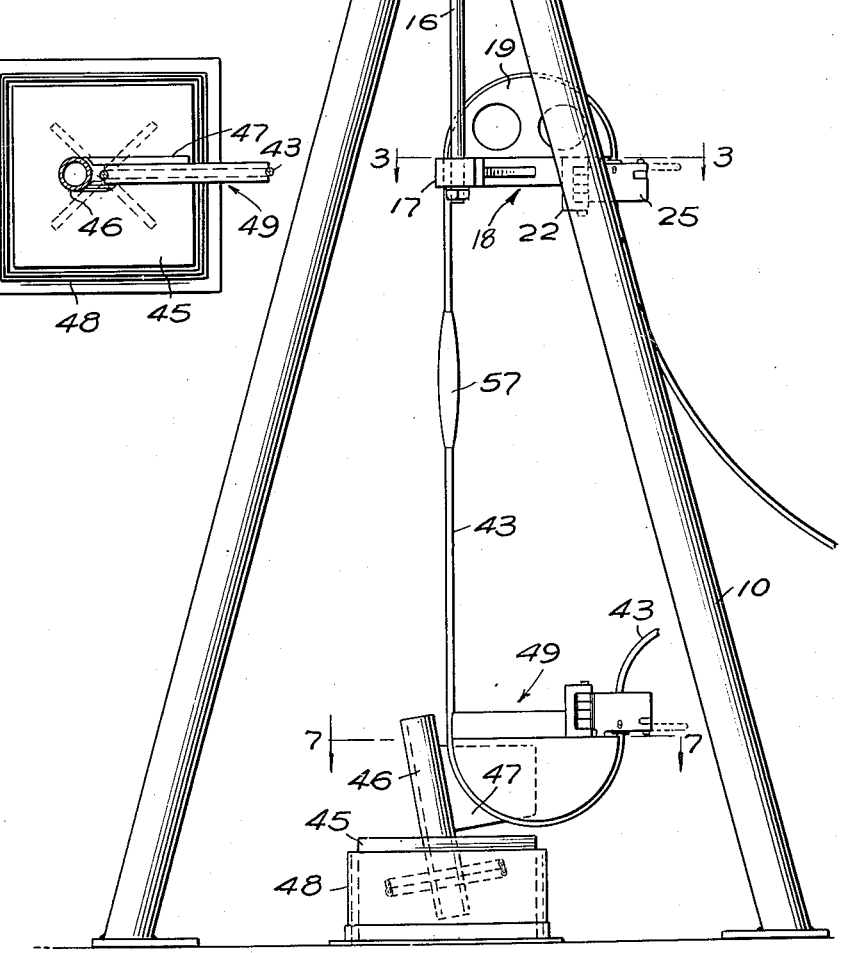

In the operation of the apparatus, the upper end of the cable 43, as viewed in Fig. 1, having a splice 57 to be tested while under tension, is placed in the groove 20 of the snubber 19. The jaws 25 and 26 are closed on the cable, the latch 40 is swung to the position shown in Fig. 3, and the cam 41 is rotated to the position shown in Fig. 3 to force the grippers 35—35 into close frictional engagement with the cable 43. The grippers 35—35 form a cylindrical passage which is directly below the right end of the arcuate groove 20, as viewed in Fig. 9, and grip the cable 43 securely therebetween. The cable 43 then is drawn under the clamping unit 49, is tightened, and is clamped by the unit 49 in the position shown in Fig. 1.

The ends of the cable 43 then are connected to a suitable test set (not shown) and the actuating fluid is supplied to the cylinder (not shown), whereby the piston thereof is forced upwardly to raise the yoke 17 and the clamping unit 18. As the unit 18 is raised, the cable 43 is drawn upwardly to raise the weight 45 in the guard 48, whereby the splice 57 of the cable is placed under tension. The guard 48 prevents anyone from placing his foot under the weight 45 when the weight is raised. The center line of the cable coincides with the center of gravity of the combined mass of the weight 45, the post 46, the plate 47, and the clamping unit 49. Thus, the weight 45 and the elements associated therewith are in horizontal positions when suspended. The test set then is operated to test the cable while the splice 57 is under tension, after which the piston is lowered to return the cable 43 and the weight 45 to the position shown in Fig. 1, and the cable is unclamped to free the apparatus for another similar testing operation.

The groove 20 formed in the snubber 19 provides a relatively long surface which frictionally engages the cable 43 during the testing operation and the inserts 30—30 are drawn upwardly, as viewed in Fig. 4, when the cable is placed under tension. As the inserts 30—30 are pulled upwardly, as viewed in Fig. 4, the wedge-shaped surfaces 28—28 and 31—31 force the inserts 30—30 toward each other, whereby the grippers 35—35 are forced into closer frictional engagement with the cable 43 to prevent relative movement between the cable 43 and the grippers 35—35.

The action of the snubber 19 assimilates most of the tension placed on the portion of the cable 43 secured to the clamping unit 18, thereby requiring a relatively small amount of force from the grippers 35—35 to hold the cable. The grippers 35—35 grip the cable 43 by only long, resilient surfaces. Thus, the grippers do not dig in or damage the cable while gripping it securely. The clamping unit 49 grips the cable in a manner similar to that just described.

What is claimed is:

In a unitary device for snubbing and clamping an electric cable without damage, the combination of an arcuate snubber having on its curved periphery a groove for receiving a bight of the cable, a bracket secured to the snubber and having an opening spaced from the snubber, a pair of clamping jaws pivotally and hingedly positioned within said opening in the bracket, a pair of inserts attached to the jaws and having complementary grooves formed therein, means for closing the jaws and the inserts to frictionally clamp a cable, a pin secured in the bracket about which the jaws hinge and pivot as a unit to bring the complementary grooves thereof into alignment with said groove in the arcuate snubber, said pin being parallel to a tangent of the snubber at the end adjacent the clamping jaws, and said jaws each having a projecting portion to contact the snubber to prevent bending of the jaws when tension is applied to the cable clamped therein.

OSCAR G. NELSON.

REFERENCES CITED

The following references are of record in the file of this patent:

UNITED STATES PATENTS

| Number | Name | Date |
|---|---|---|
| 455,547 | Morgan, Jr. | July 7, 1891 |
| 549,774 | Forst | Nov. 12, 1895 |
| 640,416 | Rigsby | Jan. 2, 1900 |
| 696,748 | Rigsby | Apr. 1, 1902 |
| 940,285 | Scruggs | Nov. 16, 1909 |
| 1,012,328 | Cope | Dec. 19, 1911 |
| 1,229,302 | McDonald | June 12, 1917 |
| 1,229,408 | Bullum | June 12, 1917 |
| 1,282,643 | Scott | Oct. 22, 1918 |
| 1,456,237 | Hough | May 22, 1923 |
| 1,499,546 | Oxley | July 1, 1924 |
| 1,512,491 | Scott | Oct. 21, 1924 |
| 1,525,122 | Ericsson | Feb. 3, 1925 |
| 1,562,568 | Lindquist | Nov. 24, 1925 |
| 1,661,045 | Lee | Feb. 28, 1928 |
| 1,872,047 | Templin | Aug. 16, 1932 |
| 1,885,855 | Moran | Nov. 1, 1932 |
| 1,945,438 | Landahl | Jan. 30, 1934 |
| 2,002,977 | Carr | May 28, 1935 |
| 2,157,092 | Allen et al. | May 9, 1939 |
| 2,187,345 | Dinzl | Jan. 16, 1940 |
| 2,327,139 | Scott | Aug. 17, 1943 |
| 2,349,520 | Ripley | May 23, 1944 |

FOREIGN PATENTS

| Number | Country | Date |
|---|---|---|
| 955 | Great Britain | 1892 |
| 3,293 | Great Britain | 1877 |
| 593,742 | Germany | Feb. 15, 1924 |